United States Patent [19]

Noyes

[11] 3,992,338

[45] Nov. 16, 1976

[54] COATING COMPOSITIONS CONTAINING AN AMINOPLAST RESIN AND AN ALKYL ACID PHOSPHATE CURING AGENT

[75] Inventor: Paul R. Noyes, Philadelphia, Pa.

[73] Assignee: E. I. Du Pont de Nemours & Company, Wilmington, Del.

[22] Filed: Aug. 21, 1974

[21] Appl. No.: 499,413

[52] U.S. Cl. .............................. 260/21; 260/22 CA; 260/22 CQ; 260/30.6 R; 260/67.6 R; 260/67.6 C; 260/68; 260/69 R; 260/69 N; 260/850; 260/851; 260/856
[51] Int. Cl.$^2$ .................... C08K 5/51; C08L 33/06; C08L 67/08; C08L 61/26
[58] Field of Search ............... 260/30.6 R, 21, 22 R, 260/67.6 R, 850, 851, 856, 33.4 R, 33.6 R, 67.6 C, 69 R, 69 N, 22 CQ, 22 CA; 252/435, 437

[56] References Cited
UNITED STATES PATENTS

| 2,005,619 | 6/1935 | Graves | 260/79.2 |
|---|---|---|---|
| 3,201,271 | 8/1965 | Simmons et al. | 117/47 |
| 3,231,419 | 1/1966 | Korpman | 117/122 |
| 3,309,327 | 3/1967 | Gayer | 260/21 |
| 3,382,294 | 5/1968 | Christenson et al. | 260/850 |

Primary Examiner—Allan Lieberman

[57] ABSTRACT

A coating composition useful in the packaging industry as a barrier coating and overprint varnish consists essentially of
- A. a nitrogen resin crosslinking agent;
- B. an optional flexibilizing component having a hydroxyl and/or carboxyl group attached thereto selected from the group consisting essentially of
  - I. a copolymer of at least one monomer selected from the group: styrene, alkyl ester of up to eight carbon atoms of acrylic and methacrylic acids with at least one other monomer selected from the group: acrylic acid, methacrylic acid, itaconic acid, hydroxyethyl acrylate, hydroxypropyl acrylate, hydroxyethyl methacrylate, and hydroxypropyl methacrylate; and
  - II. an alkyd resin prepared from fatty acid triglycerides, di- and polyols, and di- and polycarboxylic acids and/or anhydrides thereof; and
- C. a mixture of mono- and di-alkyl esters of phosphoric acid, where the molar ratio of monoester to di-ester is from 4:1 to 1:4 and the esterifying alcohol is selected from alcohols containing from eight to twelve carbon atoms and mixtures thereof and, optionally, phosphoric acid or its lower alkyl esters, said composition affording, upon cure, a coating of excellent slip properties without any additional slip agents.

9 Claims, No Drawings

COATING COMPOSITIONS CONTAINING AN AMINOPLAST RESIN AND AN ALKYL ACID PHOSPHATE CURING AGENT

BACKGROUND OF THE INVENTION

This invention is related to a polymeric coating composition of general utility in, for example, appliance or automotive finishes and coil coatings. More particularly, the coating composition is useful as a top-coat over printed substrates, especially paper, and functions both as an over-print varnish and a barrier coating.

The paper industry utilizes paper chemically treated to fulfill various requirements dictated by the intended use. Paper which is going to be printed requires a coating prior to the printing process to prevent the absorption and spreading of the ink by wicking. The printed paper requires a protective top-coat to minimize the abrasive removal of the printing ink from the surface during the stacking, shipping, and utilization, for example, in packaging.

Common to the top-coatings of the prior art is the inclusion of wax to act as slip agent. The wax migrates to the surface of the coating and the smooth, waxy surface facilitates the rapid movement of the paper and/or packages on the assembly lines. Since the wax is not bound to the coating composition there is a tendency for the wax to be removed or abraded away. The wax also often lowers the gloss of and imparts a blush or haze to the coating thereby down-grading its appearance. In many cases waxes can not be used because of incompatibility with the solvent systems needed for the binder.

The coating composition of this invention has, as one of its components, an ingredient which performs a dual role, that of catalyst and that of slip agent. In this manner the need for the use of the wax is eliminated.

SUMMARY OF THE INVENTION

According to the present invention there is provided a coating composition consisting essentially of:
A. 20–100% by weight, based on the weight of (A) plus (B), of a nitrogen resin crosslinking agent;
B. 80–0% by weight, based on the weight of (A) pllus (B), of at least one flexibilizing component, having a hydroxyl and/or carboxyl group attached thereto, selected from the group consisting essentially of
  I. a copolymer of at least one monomer selected from the group: styrene, alkyl esters of up to eight carbon atoms of acrylic and methacrylic acids with at least one other monomer selected from the group: acrylic acid, methacrylic acid, itaconic acid, hydroxyethyl acrylate, hydroxypropyl acrylate, hydroxyethyl methacrylate, and hydroxypropyl methacrylate; and
  II. an alkyd resin prepared from fatty acid triglycerides, di- and polyols, and di- and polycarboxylic acids and/or anhydrides thereof; and
C. 3–20% by weight, based on the weight of (A) plus (B), of a mixture of mono- and di-alkyl esters of phosphoric acid, wherein the molar ratio of mono-ester to di-ester is from 4:1 to 1:4 and the esterifying alcohol is selected from alcohols containing from eight to twelve carbon atoms and mixtures thereof and 0–2% by weight, based on the weight of (A) plus (B), of at least one member of the group selected from phosphoric acid and its lower alkyl esters of up to C-4.

DESCRIPTION OF THE INVENTION

The present invention is directed to an improved top-coat over printed substrates. By utilizing the catalytic agent of this invention, needed to provide a cured, thermoset coating which is resistant to solvents and is non-blocking, there results a coating of unexpectedly good slip properties even without additional slip agents. It is to be understood, however, that the addition of external slip agents is permitted and can be comtemplated within this invention.

The coating composition of this invention contains about 20–100% of a nitrogen resin and, correspondingly, about 80–0% of a flexibilizing component. Curing of the coating is catalyzed by about 3–20% of a mixed alkyl acid phosphate and can be accelerated by the optional presence of up to about 2% of phosphoric acid and/or the lower alkyl esters, up to C-4, of phosphoric acid. The composition can contain up to 20% by weight of pigments but preferably is utilized as a clear coating.

The nitrogen resins are well known to the artisans. They are alkylated products of amino-resin precursors prepared by the condensations of at least one aldehyde with at least one of urea, N,N'-ethyleneurea, dicyandiamide, and aminotriazines such as melamines and guanamines. Among the aldehydes that are suitable are formaldehyde, revertable polymers thereof such as paraformaldehyde, acetaldehyde, crotonaldehyde, and acrolein. Preferred are formaldehyde and revertable polymers thereof. The amino-resin precursors are alkylated with at least one and up to six alkanol molecules containing 1 to 6 carbon atoms. The alkanols can be straight chain, branched or cyclic.

Suitable nitrogen resins which are compatible with the other components of the coating composition and which afford a crosslinked top-coat of good gloss and slip properties include methylated urea-formaldehyde, butylated melamine-formaldehyde, alkylated benzoguanamine-formaldehyde, 6-methyl-2,4-diamino-1,3,5-triazine-formaldehyde, and mixtures thereof. A preferred cross-linking resin is N,N'-bis(methoxymethyl)urea; coatings based on this material can be cured to obtain comparable film properties faster than, for example, obtainable with a butylated urea-formaldehyde. Another preferred crosslinking resin is hexabutoxymethylmelamine affording coating compositions of good stability and a cured film of excellent slip properties. The preferred range of the nitrogen resins is from 40–80% by weight of the coating composition (excluding the catalyst) allowing the inclusion of flexibilizing agents, but still affording a hard but not brittle glossy top-coat.

The nitrogen resins can be utilized neat or dissolved in organic solvents. Acceptable solvents include methanol, iso-propanol, n-butanol, toluene, xylene, a hydrocarbon having a boiling range of 182°–219° C, 2-butoxy-1-ethanol, and mixtures thereof.

The nitrogen resins can crosslink with themselves or in the presence of flexibilizing agents having complementary functional groups such as a hydroxyl or carboxyl group.

Suitable flexibilizing agents include hydroxy- and/or carboxy-functional copolymers prepared by the polymerization of, on the one hand, hydroxyethyl acrylate, hydroxypropyl acrylate, hydroxyethyl methacrylate, hydroxypropyl methacrylate, acrylic acid, methacrylic acid, itaconic acid or mixtures thereof and, on the other hand, at least one additional monomer such as an ester selected from the C-1 to C-8 alkyl esters of acrylic acid and methacrylic acid or styrene. These polymers can be prepared by conventional methods, in bulk, solution or emulsion. Other flexibilizing agents are hydroxy- and/or carboxy-functional alkyd resins prepared from fatty acid triglycerides, glycols and/or polyols, and dicarboxylic and/or polycarboxylic acids or anhydrides thereof. The alkyd resins have an acid number of from 0.5 to 40, where the acid number is the number of milligrams of potassium hydroxide required to neutralize a one gram sample, and a viscosity range, at 25° C, on the Gardner-Holdt scale of from D at 50% solids to Z-7 at 100% solids. Suitable fatty acids include coconut oil fatty acid, linseed oil fatty acid, tall oil fatty acid, castor oil fatty acid, and soy bean oil fatty acid. Suitable glycols and polyols include ethylene glycol, the propylene glycols, the butylene glycols, glycerin, trimethylol ethane, trimethylol propane, and pentaerythritol. Suitable acids and anhydrides include phthalic acid, iso-phthalic acid, tere-phthalic acid, glutaric acid, trimellitic acid, phthalic anhydride, and trimellitic anhydride.

The flexibilizing agents can be utilized neat or they can be utilized with a solvent. Solvents useful for this purpose include iso-propanol, normat-butanol, toluene, 2-butoxy-1-ethanol, butyl acetate, xylene, 2-ethoxy-1-ethyl acetate, and an aliphatic hydrocarbon of boiling point range 180°–220° C.

While hydroxy- and carboxy-functional polymers of a wide composition range can perform satisfactorily, examples of the preferred acrylic polymers include the following, with the approximate weight ratios of the monomers shown in parentheses: butyl acrylate (30–50)/styrene (45–60)/hydroxyethyl acrylate (3–10)/acrylic acid (0.5–3) and styrene (10–20)/methyl methacrylate (25–35)/butyl acrylate (30–50)/hydroxyethyl acrylate (10–20)/acrylic acid (1–4). Among the preferred alkyd resins are a coconut oil/ethylene glycol/phthalic acid alkyd, viscosity of an 85% solution in toluene: S-U and acid number 6–8, a coconut oil/pentaerythritol/iso-phthalic acid alkyd, viscosity of 60% solution in the hydrocarbon solvent, of boiling range of 180°–220° C: Z3–Z5, acid number 5–11, a linseed oil/glycerin/phthallic acid alkyd, viscosity of 83% solution in an aromatic hydrocarbon solvent of boiling range 175°–223° C: Y-Z1, acid number 3–5, a linseed oil/benzoic acid/phthalic acid/pentaerythritol alkyd, viscosity of 55% solution in the hydrocarbon solvent: X-Z2, acid number 9–13, and soy bean oil/glycerin/phthalic acid alkyd, viscosity of a 55% solution in mineral spirits of boiling range 145°–215° C: Y-Z4, acid number 5–8.

The preferred range of the flexibilizing agent is from 60–20% by weight, affording a flexible cured top-coat of sufficient hardness to have the requisite abrasion resistance.

The coating compositions of the type hereinabove defined can be cured conventionally by alkyl esters of phosphoric acid. These miixed mono- and di-esters of phosphoric acid and their preparation are known in the chemical industry and are described, for example, in U.S. Pat. No. 2,005,619, issued on June 18, 1935. The rate of curing usually depends on the quantity and type of acid phosphate utilized; increasing levels increase catalyst in cure rate. Also, the lower alkyl esters usually act faster than the higher alkyl esters. Addition of small quantities of phosphoric acid accelerates the crosslinking process.

The catalyst utilized in the coating composition of this invention, however, uniquely fulfills a dual role. The mixed mono- and di-esters of phosphoric acid, prepared from the C-8 to C-12 alcohols or their mixtures, not only act in the expected manner of a catalyst in curing the nitrogen resins or the mixture of the nitrogen resins with the flexibilizing agents, but result, without any additional slip agent, in coatings of excellent slip properties. In a test, to be described below, measuring the coefficient of friction, values of approximately 0.2–0.4 are the typical values commonly obtained on packaging materials for the packaging industry. The lower values indicate better slipperiness and a desirable "feel" imparted by the overprint varnish to the substrate.

To illustrate the unexpected advantage resulting from the use of the catalyst of the coating composition of this invention one can compare test results obtained by the Slip and Friction Tester. A top-coat, prepared from a 60/40 weight ratio of the nitrogen resin N,N'-bis(methoxymethyl)urea and a flexibilizing copolymer of styrene/methyl methacrylate/butyl acrylate/hydroxyethyl acrylate/acrylic acid, is cast onto a coated paper substrate and cured at 150° C for five seconds in presence of a mixed mono- and di-normal-octyl and normal-decyl ester of phosphoric acid, where the molar ratio of mono- to di-ester is approximately 1:1 and the weight ratio of the esterifying alcohols is approximately 2:3. A coefficient of friction value of 0.265 is obtained. Using butyl acid phosphate in the above coating composition as the catalyst the coefficient of friction is 0.425.

To further illustrate the unanticipated dual role of the catalyst of this invention, a top-coating is prepared from a 60/40 weight ratio of a melamine-formaldehyde resin with the flexibilizing polymer described above. Curing with the mixed octyl/decyl acid phosphate gives a slip value of 0.210. A commercially available mixed phosphate ester, containing mono- and di-alkyl esters based on the C-8, C-10, C-12, C-14, and C-16 alcohols, affords an overprint varnish having a slip value of 0.338. While this latter catalyst is not strictly within the scope of this invention the presence of the higher alkyl esters of phosphoric acid can be contemplated within the invention.

The catalyst can be utilized in an amount not less than 3 and not more than 20% by weight, based on the combined weights of the nitrogen resin and the flexibilizer. Outside of these limits the rate of cure is either too slow or too fast and no satisfactory product results. Preferably, the catalyst is between 7 to 10% by weight for an optimum balance of cure rate, slip, and gloss properties. A preferred catalyst is the above described mixed mono- and di-alkyl phosphate based on normal-octanol and normal-decanol.

Optionally, if a slightly higher rate of cure is desired, without overloading the system with catalyst, a small amount, up to 2% by weight, based on the weight of the coating resin, of phosphoric acid or its lower alkyl esters can also be included in the catalyst system.

The curing of the coating composition of this invention must be rapid. The substrates, such as paper, utilized in the packaging industry, cannot withstand excessive thermal treatment. On the other hand, the topcoats must be crosslinked since one step in most packaging operations is a heat sealing step. This requires that the top-coat applied previously be crosslinked; it cannot be thermoplastic and cannot flow at the heat sealing temperature. The catalyst of this invention meets the requirement of affording a cured coating in 2-10 seconds at 150° C surface temperature.

The coating composition of this invention is applicable to a variety of substrates. It finds use on paper which has been pre-coated for good hold-out, polyethylene and polypropylene sheets, plastic films, and metals such as aluminum.

The coating composition of this invention can be utilized in many applications such as overprint varnish to protect printed surfaces from abrasion. It is also useful as a barrier coating, for example, in food packaging where the contents of the package must be protected from external agents, such as pine oil which is a common contaminant in many household goods placed on nearby shelves in the market place. Additionally, the coating composition can act as a gloss coating to upgrade the appearance of the final package.

For most application thin coatings are needed; a coating weight of 100–1000 grams per ream of paper is common.

The properties of the coating composition of this invention are tested by several methods. Slip properties are tested by the Testing Machines Incorporated's Slip and Friction Tester. This tester has a five inch by five inch platen weighing 2 pounds. A force-measuring gauge is mounted on it. This upper platen has a tacky rubber surface to contact the top specimen and to slide it over the lower sample. The base of the instrument has a clamp to hold the lower specimen. The machine is equipped with two steel rails accurately aligned so that the moving platen will always travel in a straight line. For operation the instrument is leveled and the specimen is clamped to the base with the surface to be tested facing upward. A second specimen is placed on top of it with the surface to be tested facing downward. The upper platen adheres to the top specimen without the requirement for clamps. The pulling speed of the platen is 12 inches per minute. The force necessary to maintain sliding motion is measured by the force gauge mounted on the upper platen. Test results, read from this force gauge, are given as the coefficient of friction. Slip values of 0.2–0.4 are usually required for coatings on substrates utilized in packaging machinery.

Curing of the coating composition is measured by the methyl ethyl ketone rub test as follows: A sample of the coated substrate is laid on a flat surface and rubbed gently with a piece of cheese-cloth folded several times and saturated with the solvent. This test is normally carried to twenty rubs if failure of coating has not occurred. A minimum of five rubs is considered passing for most applications.

Non-blocking of coated substrates is important. The block test is carried out as follows: A sample of the coated substrate is placed face to face with a second sample and an attempt is made to heat-seal the surfaces in a Sentinel Heat Sealer, Model 12 AS with jaws set at 177° C under 40 pounds pressure for 0.5 second dwell time. Failure of the coating to heat-seal is indicative of a well crosslinked system.

Quality of the appearance of coatings is often measured by their gloss. A 60° angle gloss is measured on a glossmeter utilizing ASTM D-523-67 to test for specular gloss; values between 40 and 80 are acceptable in an overprint varnish.

The invention can be further understood by referring to the following examples in which parts and percentages are by weight unless otherwise indicated.

EXAMPLES 1–5 a. In a suitably equipped reaction vessel are placed 144 grams of an aromatic hydrocarbon solvent, having a boiling point range of 150° to 190° C, 62 grams of normal-butanol and 83 grams of ethylene glycol monoethyl ether acetate. The contents of the vessel are brought to reflux and the following solution is added over a 2.5-hour period: styrene, 73.8 grams, methyl methacrylate, 124.5 grams, hydroxyethyl methacrylate, 68.0 grams, butyl acrylate, 184.5 grams, acrylic acid, 10.5 grams, and di-tertiary-butyl peroxide, 11.5 grams. During the addition period the contents are kept at reflux. After this time period the solids content is adjusted to approximately 60% by the addition of approximately 10 grams of the hydrocarbon solvent and 70 grams of butyl acetate. The final product has the approximate composition of styrene/methyl methacrylate/butyl acrylate/hydroxyethyl acrylate/acrylic acid//16/27/40/14.5/2.5. It has an acid number between 17 to 20 and solids content of approximately 55%.

b. In a suitable reaction vessel, equipped with thermometer, condenser with a water take-off head, and stirrer are placed coconut oil, 271.2 grams, ethylene glycol, 188.7 grams, and sodium phenoxide, 0.5 gram. The vessel is purged with nitrogen and the contents are heated to approximately 190° C and maintained at this temperature for a period of one hour. The vessel is allowed to cool and 1246 grams of toluene is added followed by the addition of phthalic anhydride, 364.6 grams. The contents of the reactor are heated to a rapid reflux and toluene is distilled. The reactor temperature is raised to 230° C and heating and distilling are continued until the acid number reaches approximately 10. At this point the contents are discharged, the product having solids content of approximately 95%. The final acid number of this alkyd is approximatey 10, viscosity on the Gardner-Holdt scale is between S and U and the alkyd has the approximate composition of coconut oil (35), ethylene glycol and phthalic anhydride (61), excess ethylene glycol (4).

c. In a suitably equipped reaction vessel are placed a 50% aqueous solution of formaldehyde, 405 grams and normal-butanol, 480 grams. To this solution is added 0,2 gram of sodium hydroxide and the pH is adjusted with 90% formic acid to approximately 6.3. To this solution is added 0.5 gram of mono-sodium phosphate, followed by melamine, 170 grams. The contents of the reactor are slowly brought to reflux and water is being removed over an approximately four-hour period. The reaction mixture is adjusted to contain approximately 55% non-volatiles by the addition of an approximately 2:1 weight ratio mixture of n-butanol and xylene. The final product, a butylated melamine-formaldehyde resin, has an acid number of 0.5 maximum.

d. Coating compositions are prepared by mixing the nitrogen resin crosslinker with the flexibilizing agent, in a weight ratio 60:40 on dry resin basis. To this mix is added 10 parts of the catalyst and the composition is diluted to 30% solids with either toluene or isopropanol. Each coating composition is cast on a paper substrate with a number 8 wire-wound rod and the coating is cured at a temperature sufficient to reach approximately 150° C at the coating surface in approximately five seconds. The resulting coating weight is 500 grams per ream of paper. The compositions and test data are shown in the accompanying Table 1. When paratoluene sulfonic acid is utilized in a formulation similar to that of Example 2, a slip value of 0.47 is obtained. A composition such as this or one shown by Example 3 requires external slip agents when utilized as overprint varnish.

TABLE 1

|  | Example 1 | Example 2 | Example 3 | Example 4 | Example 5 |
|---|---|---|---|---|---|
| N-resin of Ex. 1(c) |  | X |  | X | X |
| N,N'-bis(methoxy-methyl)urea | X |  | X |  |  |
| Resin of Ex. 1(a) | X | X | X | X |  |
| Alkyd of Ex. 1(b) |  |  |  |  | X |
| Catalyst 1 | X | X |  |  | X |
| Catalyst 2 |  |  | X |  |  |
| Catalyst 3 |  |  |  | X |  |
| Slip Test | 0.265 | 0.210 | 0.425 | 0.338 | 0.222 |
| MEK Rub Test | 20 | 7 | 20 | 6 | 8 |
| Block Test | OK | OK | OK | OK | OK |
| Gloss (60°) | — | 56 | — | 73 | 60 |

Notes:
Catalyst 1: mixed phosphate ester, approximately equimolar mixture of mono- and di-alkyl esters; approximate weight ratio of $C_8:C_{10}$ = 2:3
Catalyst 2: butyl acid phosphate
Catalyst 3: mixed phosphate ester, containing mono- and di-alkyl esters based on the C-8, C-10, C-12, C-14, and C-16 alcohols

EXAMPLES 6–8

To a normal-butanol solution of a urea-formaldehyde resin containing 60 parts of the nitrogen resin is added 40 parts of the flexibilizing resin from Example 1(a). The mixture is diluted to 30% solids content with isopropanol and to each 100 parts, on dry basis, of the above solution is added 10, 5, and 3.3 parts, respectively, of the mixed phosphate ester described as catalyst 1 in Table 1. In Table 2 are given the results of the test on the cured coatings.

TABLE 2

|  | Slip (coefficient of friction) | | |
|---|---|---|---|
| Catalyst 1 | Example 6 | Example 7 | Example 8 |
| (parts/100 parts) |  |  |  |
| 10 | 0.225 |  |  |
| 5 |  | 0.233 |  |
| 3.3 |  |  | 0.500 |

What is claimed is:

1. A coating composition consisting essentially
   A. 20–100% by weight, based on the weight of (A) plus (B), of a nitrogen resin crosslinking agent;
   B. 80–0% by weight, based on the weight of (A) plus (B), of at least one flexibilizing component, having a hydroxyl and/or carboxyl group attached hereto, selected from the group consisting essentially of
      I. a copolymer of at least one monomer selected from the group: styrene, alkyl esters of up to eight carbon atoms of acrylic and methacrylic acids with at least one other monomer selected from the group: acrylic acid, methacrylic acid, itaconic acid, hydroxyethyl acrylate, hydroxypropyl acrylate, hydroxyethyl methacrylate, and hydroxypropyl methacrylate: and
      II. an alkyd resin prepared from fatty acid tri-glycerides, di- and polyols, and di- and poly-carboxylic acids and/or anhydrides thereof; and
   C. 7–10% by weight, based on the weight of (A) plus (B), of a blend of mono- and di-alkyl esters of phosphoric acid, wherein the molar ratio of mono-ester to di-ester is from 4:1 to 1:4 and the esterifying alcohol is selected from alcohols containing from eight to twelve carbon atoms and mixtures thereof and 0–2% by weight, based on the weight of (A) plus (B), of at least one member of the group selected from phosphoric acid and its lower alkyl esters of up to C-4.

2. A coating composition consisting essentially
   A. 40–80% by weight, based on the weight of (A) plus (B), of a nitrogen resin crosslinking agent;
   B. 60–20% by weight, based on the weight of (A) plus (B), of at least one flexibilizing component, having a hydroxyl and/or carboxyl group attached thereto, selected from the group consisting essentially of
      I. a copolymer of at least one monomer selected from the group: styrene, alkyl esters of up to eight carbon atoms of acrylic and methacrylic acids with at least one other monomer selected from the group: acrylic acid, methacrylic acid, itaconic acid, hydroxyethyl acrylate, hydroxypropyl acrylate, hydroxyethyl methacrylate and hydroxypropyl methacrylate; and
      II. an alkyd resin prepared from fatty acid triglycerides, di- and polyols, and di- and polycarboxylic acids and/or anhydrides thereof; and
   C. 7–10% by weight, based on the weight of (A) plus (B), of a blend of mono- and di-alkyl esters of phosphoric acid, wherein the molar ratio of mono-ester to di-ester is from 4:1 to 1:4 and the esterifying alcohol is selected from alcohols containing from eight to twelve carbon atoms and mixtures thereof and 0–2% by weight, based on the weight of (A) plus (B), of at least one member of the group selected from phosphoric acid and its lower alkyl esters of up to C-4.

3. A composition of claim 1 wherein the nitrogen resin crosslinking agent is a condensation product of:
   A. at least one amino-resin precursor selected from the group consisting of
      I. urea
      II. N,N'-ethyleneurea
      III. 2,4-diamino triazine and
      IV. 2,4,6-triaminotriazine;
   B. formaldehyde and revertable polymers thereof; and
   C. an alcohol of up to six carbon atoms.

4. A composition of claim 1 wherein the flexibilizing resin of B(II) is an alkyd resin prepared from A. a fatty acid triglyceride based on coconut oil fatty acid, linseed oil fatty acid, soy bean oil fatty acid, tall oil fatty acid or castor oil fatty acid;

B. a di- or polyol, selected from ethylene glycol, 1,2-propylene glycol, 1,3-propylene glycol, 1,2-butylene glycol, 1,3-butylene glycol, 1,4-butylene glycol, glycerin, trimethylol ethane, trimethylol propane and pentaerythritol, and C. a di- or polycarboxylic acid and/or anhydrides thereof, selected from phthalic acid, iso-phthalic acid, tere-phthalic acid, glutaric acid, trimellitic acid, phthalic anhydride, and trimellitic anhydride, wherein the acid number is from 0.5 to 40.

5. A coating composition consisting essentially of
A. 50–70% by weight, based on the weight of (A) plus (B), of N,N'-bis(methoxymethyl)urea;
B. 50–30% by weight, based on the weight of (A) plus (B), of a flexibilizing resin of the composition styrene (48–58% by weight)/butyl acrylate (33–43% by weight)/hydroxyethyl acrylate (5–10% by weight)/acrylic acid (0.5–2% by weight); and
C. 7–10% by weight, based on the weight of (A) plus (B), of a mixture of mono- and di-alkyl esters of phosphoric acid, wherein the molar ratio of mono- to di-ester is from 2:1 to 1:2 and the esterifying alcohols are normal-octanol and normal-decanol in the weight ratio of from 3:2 to 2:3.

6. A coating composition consisting essentially of
A. 50–70% by weight, based on the weight of (A) plus (B), of hexabutoxymethylmelamine
B. 50–30% by weight, based on the weight of (A) plus (B), of a flexibilizing resin of the composition styrene (48–58% by weight)/butyl acrylate (33–43% by weight)/hydroxyethyl acrylate (5–10% by weight)/acrylic acid (0.5–2% by weight); and
C. 7–10% by weight, based on the weight of (A) plus (B), of a mixture of mono- and di-alkyl esters of phosphoric acid, wherein the molar ratio of mono- to di-ester is from 2:1 to 1:2 and the esterifying alcohols are normal-octanol and normal-decanol in the weight ratio of from 3:2 to 2:3.

7. A composition of claim 6, wherein the catalyst component (C) contains, in addition to the 7–10% by weight, based on the weight of (A) plus (B), of the mixed phosphate esters, 0.5–1.5% by weight, based on the weight of (A) plus (B), of phosphoric acid.

8. A coating composition consisting essentially of
A. 50–70% by weight, based on the weight of (A) plus (B), of hexabutoxymethylmelamine
B. 50–30% by weight, based on the weight of (A) plus (B), of a flexibilizing alkyd resin prepared from
I. 30–40 parts by weight, based on the weight of the alkyd, of coconut oil;
II. 40–50 parts by weight, based on the weight of ethylene glycol; and
III. 20–30 parts by weight based on the weight, of phthalic anhydride.
wherein the alkyd resin has an acid number of 6–8 and a viscosity on the Gardner-Holdt scale, of an 85% solution in toluene, of S-U.
C. 7–10% by weight, based on the weight of (A) plus (B), of a mixture of mono- and di-alkyl esters of phosphoric acid, wherein the molar ratio of mono- to di-ester is from 2:1 to 1:2 and the esterifying alcohols are normal-octanol and normal-decanol in the weight ratio of from 3:2 to 2:3.

9. A composition of claim 7 wherein the mixture of mono- and di-alkyl esters of phosphoric acid of (C) contains, in addition to the normal-octyl and normal-decyl esters, 5–25% by weight, based on the weight of (C), of the normal-dodecyl esters.

* * * * *